US012683820B2

(12) United States Patent
Theeg et al.

(10) Patent No.: US 12,683,820 B2
(45) Date of Patent: Jul. 14, 2026

(54) METHOD FOR ASSIGNING INFORMATION REFERRING TO A PHYSICAL OBJECT TO A NONFUNGIBLE TOKEN

(71) Applicant: AUTHENTIC.NETWORK GMBH, Chemnitz (DE)

(72) Inventors: Frank Theeg, Chemnitz (DE); Torsten Stein, Chemnitz (DE)

(73) Assignee: AUTHENTIC.NETWORK GMBH, Chemnitz (DE)

( * ) Notice: Subject to any disclaimer, the term of this patent is extended or adjusted under 35 U.S.C. 154(b) by 73 days.

(21) Appl. No.: 18/717,578

(22) PCT Filed: Dec. 9, 2022

(86) PCT No.: PCT/EP2022/085169
§ 371 (c)(1),
(2) Date: Jun. 7, 2024

(87) PCT Pub. No.: WO2023/105041
PCT Pub. Date: Jun. 15, 2023

(65) Prior Publication Data
US 2025/0055713 A1     Feb. 13, 2025

(30) Foreign Application Priority Data
Dec. 10, 2021     (LU) ........................................ 500989

(51) Int. Cl.
| | |
|---|---|
| H04L 9/00 | (2022.01) |
| G06T 9/00 | (2006.01) |
| G06V 10/46 | (2022.01) |

(52) U.S. Cl.
CPC .................. H04L 9/50 (2022.05); G06T 9/00 (2013.01); G06V 10/46 (2022.01); H04L 2209/56 (2013.01)

(58) Field of Classification Search
CPC ....... H04L 9/50; H04L 2209/56; H04L 63/12; G06T 9/00; G06V 10/46; G06F 21/64
See application file for complete search history.

(56) References Cited

U.S. PATENT DOCUMENTS

| | | | | |
|---|---|---|---|---|
| 2020/0127834 A1* | 4/2020 | Westland | .............. | H04L 9/3221 |
| 2020/0184041 A1* | 6/2020 | Andon | .................... | G06F 21/16 |
| 2020/0351094 A1* | 11/2020 | Canterbury | ........... | H04L 9/0637 |
| 2021/0150626 A1* | 5/2021 | Robotham | .......... | H04L 63/0442 |
| 2021/0174377 A1* | 6/2021 | Rahimizad | ....... | G06K 19/06037 |

(Continued)

FOREIGN PATENT DOCUMENTS

WO     WO-2021140460 A1 *     7/2021     ............... H04L 9/50

OTHER PUBLICATIONS

Search Report and Written Opinion of the International Searching Authority (ISA) for PCT Application PCT/EP2022/085169, provided by the European Patent Office on Mar. 13, 2023.

*Primary Examiner* — Blake I Narramore
(74) *Attorney, Agent, or Firm* — Hodgson Russ LLP

(57)     ABSTRACT

The invention relates to a method for assigning information referring to a physical object to a nonfungible token, wherein the method comprises the following steps: creating a nonfungible token, in particular in a blockchain, optical acquiring an image of a physical information carrier, wherein the image comprises at least one non-encoded image part and at least one encoded image part, identifying the encoded image part, decoding the encoded image part and assigning the decoding result to the nonfungible token.

19 Claims, 9 Drawing Sheets

(56) References Cited

U.S. PATENT DOCUMENTS

| 2021/0326815 | A1* | 10/2021 | Brody | .................. | H04L 9/3239 |
| 2022/0366495 | A1* | 11/2022 | Gottehrer | ................ | G06F 21/64 |
| 2023/0308275 | A1* | 9/2023 | Kambara | ............... | G16B 50/10 |

* cited by examiner

| Result of step V6 | Result of step V7 |
|---|---|
| A-Code | C-Authentic |
| B-no complete Code | D-Fake |

Figure 9

| Case | Result of step V6 | Result of step V7 |
|------|-------------------|-------------------|
| 1 | A-Code | C-Authentic |
| 2 | A-Code | C-Authentic |
| 3 | A-Code | D-Fake |
| 4 | A-Code | D-Fake |
| 5 | B-no complete Code | C-Authentic |
| 6 | B-no complete Code | D-Fake |

METHOD FOR ASSIGNING INFORMATION REFERRING TO A PHYSICAL OBJECT TO A NONFUNGIBLE TOKEN

The invention relates to a method for assigning information referring to a physical object to a nonfungible token.

A nonfungible token is a unit of data which can be stored in a blockchain, and that can be used to certify an asset to be unique. For example, nonfungible tokens are being used to represent digital items such as photos, videos, audio files, and other types of digital files. However, access to a copy of the original digital file is in principle not restricted to the buyer of the nonfungible token. Copies of such digital items may be available for anyone to obtain. nonfungible token on the other hand can be stored in blockchains to provide the owner with a proof of ownership that is separate from copyright. In contrary to fungible tokens, nonfungible token cannot be split.

Up to now, NFTs were limited to the digital world. However, the problem of for example counterfeiting also exists in the real world of physical objects. For example, pieces of art, such as paintings or limited prints, or other tradable goods, such as clothing items, and collectables are subject to illegal copying. It is thus desirable to provide physical objects with a proof of ownership which cannot be easily copied. Furthermore, it is desirable to provide physical objects with a unique identification.

A first kind of identification mark which could be read out electronically was introduced by the barcode, which was first developed in 1949. A next generation of physical identification was introduced by the QR code ("Quick Response Code") in 1994. Besides an electronic identification, the QR code can also store data. However, identification mark can be manipulated by either changing the information stored on the QR code and/or by attaching the QR code to for example a counterfeit.

With the growing proliferation smartphones and tablet computers and corresponding applications and their use in daily life, there has been a growing need for providing a link between physical objects and the digital world in order to provide a user and/or consumer of goods with additional information associated with the physical object in the digital world. As a matter of course there is the need that said information are correct and not manipulated by a third party.

It is an object of the present invention to provide a method for providing user and/or consumer of goods with correct information associated with the physical object in the digital world in an easy and simple manner.

The object is solved by a method for assigning information referring to a physical object to a nonfungible token, wherein the method comprises the following steps:

creating a nonfungible token, in particular in a blockchain, optical acquiring an image of a physical information carrier, wherein the image comprises at least one non-encoded image part and at least one encoded image part, identifying the encoded image part, decoding the encoded image part and assigning the decoding result to the nonfungible token.

The advantage of the invention is that the nonfungible token is assigned to a physical object. The token comprises information referring to the physical object and, thus, corresponds to a digital twin of the physical object. The digital twin can act as a digital record of the physical object. For example, the digital twin is a record which can show the name of the current owner of the physical object and/or previous owners. Furthermore, other actions in the real world can be tracked in the digital twin. In particular, the digital twin can be used as a service record of the physical object. Thus, the digital twin may also increase protection against counterfeiting of the physical object as the information relating to the physical object are not attached to the product itself.

Another advantage is that due to the provision of encoded information on the physical information carrier it is not easy to get access to the data of the nonfungible token in order to manipulate the information. This ensures that the information assigned to the nonfungible token are correct.

A nonfungible token functions like a cryptographic token. Unlike cryptocurrencies such as Bitcoin or Etherium, for example, nonfungible tokens are not mutually interchangeable, in other words, nonfungible tokens are unique or not fungible. The nonfungible digital token is created, for example in a blockchain. The blockchain has the advantage that it is processed in a distributed network and therefore provides a high level of data security.

Much like Bitcoin or Etherium, transactions of nonfungible tokens can be securely tracked in a blockchain. This way, a change of ownership or any other transaction of the physical object can also be performed and tracked in the blockchain. This also increases the correctness of the information assigned to the nonfungible token. With "assigned" it is meant that the nonfungible token comprises said information. That means, each time when a user has the permission to read the nonfungible token, the user has access to said information.

The physical object can be any object of a certain value which can be traded and/or collected by a user. For example, the physical object can be a piece of art such as a painting or a sculpture. In another preferred example, the physical object may be a clothing item or a piece of sports equipment, such as a pair of sneakers, a dress, a shirt, or any other kind of clothing item.

Furthermore, the physical object may be a collectible item of value, for example a watch or a piece of jewelry. In other preferred embodiments, the physical object may be an electronic gadget, a piece of consumers' electronics, an automobile, or any other tradable object.

An optical acquiring device is used to optically acquire the image of a physical information carrier. This means that the physical information carrier has the image to be acquired from the optical acquiring unit. This information is assigned to the physical object when the physical information carrier is attached to the physical object and can now be used as link between the physical object and the nonfungible token as is explained below more in detail. The physical information carrier can be any item that is capable to comprise the image to be acquired from the optical acquiring device. For example, the item can be a label comprising the image. The optical acquiring device can be any optical device for acquiring information. In particular, said device can be a mobile phone, tablet or any other device comprising an objective for receiving optical information.

The physical information carrier can have several encoded image parts that are arranged on different positions within the outer contour and/or are surrounded by the non-encoded image parts. Furthermore, it should be clear that outer contour in a very simple comprehension means just an image or a picture. This said, the encoded image part can also be understood as part of the image or picture without needing additional space or disturbing the image like a barcode would do. This is another advantage of the said invention. Additionally, the optical acquiring device can identify the encoded image part and/or decode the identified encoded image parts.

As explained below more in detail an encoded image part can be manipulated. In particular, the grid points of the encoded image part can be manipulated. The manipulation of the grid points of the encoded image part can be done such that the encoded image part has another grid property than the non-encoded image part. As discussed above, a coded information is assigned to the encoded image part. In contrary to that, in a non-encoded image part, the grid points are not manipulated. The manipulation can be done such that it is not visible via a human eye. That means, the grid points can be manipulated such that said manipulation is not visible via the human eye.

With "decoding" it is meant that the manipulation of the of encoded image part is recognized and information assigned to the encoding image parts is converted into a readable and according to this processable form or format. This said the decoding operation is the opposite of the coding operation. In particular, the coded information assigned to the encoding image part is determined.

The coded information can be a digital code format. The code format can be a binary code or a hexadecimal code or any other form of information coding. The decoding result can be determined based on an intermediate result of the decoding. The intermediate result can be available in the aforementioned digital code format. The decoding result can be used as ID so that this ID and the nonfungible token are assigned to each other. Having this ID available on a physical information carrier the link between real world and digital word is done by this assignment.

Furthermore, the optical acquiring device can send the decoding result to a cloud server or blockchain node discussed below. All the aforementioned functions of the optical acquiring device can be performed by an application that can be executed by the user in order to create the nonfungible token.

According to an embodiment the image can comprise an acquirable contour or like foresaid the acquirable contour is the image and/or picture itself. The at least one encoded image part can be arranged within the contour of the image. The image can be arranged only on a part of the physical information carrier so that it has a closed outer contour. Alternatively, the rim of the physical information carrier can form a part of the contour of the image.

The optical acquiring device can be configured to acquire the whole physical information carrier specifically the outer contour of it and the non-encoded image part and the encoded image part that is arranged within the whole physical information carrier specifically within the outer contour of the information portion.

According to an embodiment an assignment process for assigning the information to the nonfungible token comprises that an application is executed for creating the nonfungible token. The executed application can connect with a wallet server and/or a cloud server and/or a blockchain node. With "connect" a data connection is meant. Additionally, a wallet address can be created on the wallet server. The application can be a web-based application, in particular a browser extension like Metamask, that is used among others for managing nonfungible tokens. After the application is started the application can be connected with the wallet server and/or blockchain node and/or a cloud server.

The application can generate an identifier. The identifier can be generated after the application is connected with the wallet server. The function of the identifier is to enable a link between the digital world and the physical world as is explained below more in detail. The identifier can be a QR code or any other means that can be acquired by an acquiring device. The acquiring device is a device for optically acquiring the identifier. In particular, the acquiring device can be a mobile phone or tablet or any other device having an objective for acquiring the identifier.

The acquiring device can be connected with the application. The acquiring device is connected with the application after the identifier is acquired. In particular, the acquiring device acquires the identifier and afterwards peers with the blockchain node and/or cloud server. That means, a data exchange between the acquiring device and the blockchain node and/or cloud server is possible after the acquiring device is peered with the blockchain node and/or cloud server. The acquiring device can optically acquire the identifier. However, alternatively the identifier can be acquired in a non-optical manner. For example, a text code can be entered in the acquiring device.

An acquiring device can acquire the image from the physical information carrier. In particular, the acquiring device can acquire the non-encoded image part and the encoded image part from the image of the physical information carrier. Additionally, the acquiring device can decode the encoded image part. In particular, the acquiring device can transmit the decoding result to the application server. Thus, the connection between the nonfungible token the physical object is created by means of the decoding result. The nonfungible token now comprises at least the decoding result as information which is assigned to the nonfungible token. Said decoding result assigns the physical object to the nonfungible token. Thus, the decoding result functions as a link between the physical object and the nonfungible token. The acquiring device for acquiring the image from the physical information carrier can be the same as for acquiring the identifier.

It is also possible to assign further information referring to the physical object to the nonfungible token. Said further information can be created by the user. For example, the user can enter data by means of the acquiring device that are transmitted to the blockchain node and/or cloud server. The further information can be information in text form, for example data about the physical object, and/or pictures of e.g. the physical object. Additionally, further information can also be information about geolocation, data bases, serial number of the acquiring device, user information, Log-In and password data etc., Of course, the further information can be other data relating to the physical object.

The nonfungible token is sent to the wallet address after the decoded information is transmitted to the blockchain node and/or cloud server. If further information is created, the nonfungible token is sent to the wallet address on the wallet server after the further information is transmitted to the blockchain node and/or cloud server. The user can control the time when the nonfungible token is sent to the wallet address by means of the application executed on the blockchain node and/or cloud server. After sending the decoding result to the wallet server the nonfungible token can be amended and/or is visible for the public or at least for the user. For example, the nonfungible token can be assigned to a user, transferred to a new user, the information assigned to the nonfungible token can be amended and/or the information assigned to the nonfungible token can be read. The nonfungible token can be stored in a cloud.

The decoding result can be a hash value. The hash value can be the result of a hash function. The hash function may be any function that can be used to map data of arbitrary size to fixed-size values. As an input for the hash function, the information coded in the encoded image part or parts may be used. If the decoding result is a digital code format, in particular a binary value, it can be directly, i.e. without interoperations, transmitted to the blockchain node or cloud server. If the decoding result is a hash value, a hash generating operation can be performed after the digital code format was determined by decoding the at least one encoded image part.

After sending the nonfungible token to the wallet server, the nonfungible token is created on IPFS (Interplanetary file system). IPFS is a protocol and peer-to-peer network for storing and sharing data in a distributed file system. In contrary to a centrally located server, IPFS is built around a decentralized system of user-operators. The user-operators hold a portion of the overall data, creating a resilient system of file storage and sharing. Furthermore, the nonfungible token may be at least partially encrypted, which may advantageously increase data security.

The physical information carrier having the image can be attached to the physical object. In particular, the physical information carrier can be attached to the physical object after the decoding result is transmitted and/or before the nonfungible token is sent to the wallet server. Alternatively, the physical information carrier can be attached to the physical object before the decoding result is transmitted. The physical information carrier can be permanently applied onto the physical object. Thus, by applying the physical information carrier on the physical object, a permanent connection between the physical information carrier and the physical object is created in the real world, and thus, a permanent link between the nonfungible token and the physical object is generated. For example, the physical information carrier, in particular the information portion, may serve as a proof of authenticity and/or a copy protection. Moreover, it can serve as a unique identifier which may also be used to prove ownership of the physical object. As an example, a bicycle (or any other object) may thus be protected against theft.

The physical information carrier can be attached to the physical object in a non-detachable manner. In particular, the physical information carrier can be glued or stick to the physical object. The physical information carrier can have several layers. In particular, the physical information carrier can have a bottom layer which is directly attached to the physical object. Said bottom layer can have an adhesive. Said bottom layer with or without adhesive can have incisions that are configured such that the bottom layer of the physical information carrier is destroyed if someone tries to remove it. This prevents or reduces counterfeiting or stealing of the physical information carrier. Furthermore, the bottom layer can be made out of a self-destructive material designed to print on but once applicated it will tear of even without incisions but additional incisions will increase the destruction when tried to peel off. Such self-destructive materials are designed in such way that the tear-out force of this material is lower than the adhering forces when an adhesive is applied or any other application method will have when the self-destructive material is being used as bottom material for such a physical information carrier. Additionally, the physical information carrier can comprise an intermediate layer comprising the image and a top layer. The top layer can cover the intermediate layer and thus protect the intermediate layer. Further, the top layer can comprise silicone or polyurethane or consist of silicone or polyurethane or other suitable materials.

According to an embodiment the decoding can occur as follows in order to receive the decoding result. After acquiring the image of the physical information carrier by the acquiring device, the encoded image parts can be extracted. Thus, the encoded image parts are known after the extraction and can be further processed. Afterwards, the encoded image parts can be classified. Classification is a process related to categorization, the process in which ideas, data and/or objects are recognized, differentiated and understood. For classification a binary value or another value can be assigned to each encoded image part. The result of the classification can be a bit stream, when a binary value, namely 1 or 0, is assigned to the encoded image part, or a data stream, when another value than a binary value is assigned to the encoded image part. This bit stream or data stream can correspond to the decoding result.

For improvement of the accuracy of the method, a check sum test, for example CRC, can be applied on the determined bit stream or data stream. Additionally, a bit correction or data stream correction can be performed. Thereafter, a payload extraction can be performed. The result of the payload extraction can correspond to the decoding result.

As discussed above, the decoding result can be sent to an electrical device, in particular a server, in particular cloud server and/or a data base and/or a blockchain and/or a wallet server, and/or a computer, to perform an action. The electrical device is any device with which data can be processed and which does not correspond to the acquiring device and or is not a part of the acquiring device. In particular, the sent decoding result can be compared with a predetermined code stored on the server and an action can be executed on the basis of the comparison result. An action could be to assign the decoding result to a non fungible token if the comparison result is fulfilled or vice versa. Additionally or alternatively, information stored in the electrical device, in particular server, can be sent to the acquiring device or vice versa when the comparison result is fulfilled. The information could be the object that is assigned to the decoding result.

According to an embodiment it can be determined on the basis of the encoded image part or parts whether the physical information carrier is an authentic physical information carrier. Thereto, in a first step, it can be checked whether the encoded image parts are present. In particular, it is checked whether the encoded image parts, in particular the grid points, are manipulated in a predetermined manner, i.e. according to a predetermined manipulation method. The manners how the encoded image parts have to be manipulated, i.e. the predetermined manipulation method, can be stored in the acquiring device or an app on said device, in particular the user terminal. This enables that the authenticity check can be performed even if the user terminal is not connected with a server, in particular a webserver or in other words offline to any data processing device beyond the user terminal itself. The authenticity of the physical information is supported by the fact that the encoded information and the readout of this information is hard to copy. Thus, this determination enabled to identify counterfeits in an easy manner.

In particular, the at least one encoded image part can be compared with a predetermined information, in particular stored in the acquiring device, and dependent on the comparison result it is determined whether the physical information carrier is an authentic physical information carrier. The predetermined information corresponds to information about the at least one manipulation method that is used for manipulating the at least one encoded image. It is clear that the encoded image part can be manipulated by one or more manipulation methods. Thus, the predetermined information corresponds to one or more manipulation methods. The physical information carrier is considered to be authentic when the at least one manipulation method used for manipulating the encoded image part corresponds to the predetermined at least one manipulation method. Furthermore, if a counterfeiter would apply the same manipulation method as the predetermined information would expect, a classification process will look in detail if every encoded image part is authentic or not and do an overall classification if necessary. This can also affect multiple parameters which are even not recognized as such without knowing the above mentioned classification process. Most of the manipulation processes are not visible to the naked eye and even with machine readable options no prediction or copying will be successful if the classification process on the acquiring device is not known. This will lead to optical copies hard to distinguish to the original with the naked eye but without a usable decoding result and/or manipulation attributes used in the classification process to prove that this is an authentic physical information carrier.

The determination whether the physical information carrier is an authentic physical information carrier can be performed on the acquiring device, in particular user terminal, and/or on a server. The determination on the user terminal, e.g. mobile, has the advantage that the determination can also be performed in regions where no internet connections is available. Another advantage of the invention is that the determination of the decoding result and the authenticity check can be performed on the same acquiring device. As mentioned before the authenticity check can be performed on the acquiring device without the need of any network connection.

The authenticity check is based on that copying machine will render the image with the encoded and non-encoded parts. This will lead to influence or even destroy the applied manipulation method. For example, if a colour channel magenta is manipulated in the physical information carrier in that way that the encoding is based on changing the screen angle, a copying machine rearranges said image part and therefor destroy the code at least partially. Thus, by considering said encoded image part, it can be easily seen whether the encoded image part is manipulated by the predetermined manipulation method or not. If not, the physical information carrier is not considered as authentic.

According to an embodiment the decoding result can be assigned to the non-fungible token when the decoding result correspond to the predetermined code stored in the electrical device, in particular server, and when the physical information carrier is considered as authentic in the authentic check discussed above. In other cases in which at least one of said conditions is not fulfilled a warning can be provided, in particular displayed on the acquiring device, to the user.

According to an embodiment the image can be rendered by means of a printing grid. The non-encoded image part and the encoded image part differ in a printing grid property from each other. The distance between two grid points of the encoded image part can be arranged such that they are not visible by a human eye. The grid points of the encoded image part are manipulated with respect to the grid points of the non-encoded image part. A digital code format, in particular a binary value or a hexadecimal value, can be assigned to the encoded image part.

The grid points in the encoded image part can have at least one, in particular four, colours. The manipulation of the grid points of the encoded image part can comprise at least one of the following:

exchanging the screen angle between two or more colours and/or
changing the screen angle of at least one colour and/or colour and/or
changing the running width or raster frequency of the line screen of at least one colour and/or
change of the frequency of frequency modulated of at least one colour and/or
change of amplitude in amplitude modulated rasters of at least one colour of at least one colour and/or
change of the frequency in amplitude modulated of at least one colour and/or
change of amplitude in the case of frequency-modulated rasters of at least one colour and/or
change of the area content of the grid points of at least one colour and/or
change of the contour of the grid points of at least one colour and/or
addition of at least one colour in the form of infrared, ultraviolet or other special colour or varnish and/or
replacement of at least one of the colours in the CMYK colour space by another colour in the form of infrared, ultraviolet or other special colour or varnish and/or
Replacing the colour tones obtained by subtractive colour mixing of the process colours by at least one spot colour or a spot colour and/or
changing the achromatic composition by replacing equal parts of the process colours CMY completely or partly with black (K) and/or an additional black tone and/or
changing the colour composition when printing with more than four process colours.

Printing the code image may refer to any kind of process of preparing a physical code image which can be applied to the physical object. Thus, printing may include printing with a laser printer or ink jet printer or any other kind of printing process onto a piece of paper or attachable label without being limited to that. Furthermore, printing may refer to methods of engraving, for example laser engraving, embossing, carving, stitching, weaving, embroidering, or similar methods for applying the physical code image onto the physical object.

The use of encoded image parts with manipulated grid points for coding information has the advantage that the decoding process can be performed by the acquiring device even if the acquiring device is offline and thus not connected to a network. This is possible as the application executed in the acquiring device can decode the information coded in the encoded image parts by analyzing property of the encoded image parts, in particular their grid points, in particular and the abovementioned methods of their manipulation compared to the not manipulated grid points of the physical information carrier.

According to an embodiment an assignment process for assignment the nonfungible token from a wallet, to which the nonfungible token is assigned, to a further wallet. The further wallet can be a wallet of another user. This assignment process can relate to an owner change of the nonfungible token. In a first step, a user may start an application (app) which is executed on a user terminal. Using a dedicated app may have the advantage that specific functions may be provided to a user.

In a second step, the user may scan the image of the physical information carrier using the application, for example by using a built-in camera of the user terminal. Additionally, the encoded image part is determined and decoded by means of the application. Thus, at the end of process the application knows the decoding information and, thus, knows the nonfungible token assigned to the decoding information.

In a next step, the application may determine or create a further wallet address relating to the further wallet. Next, the app may request the nonfungible token in the blockchain by transmitting the decoding result, in particular the hash value, to the wallet server to which the nonfungible token is assigned by using the application.

In case of a first owner change, i.e. in a case in which the token has to be assigned to another user after the nonfungible token is created, a secret code can also be sent to the wallet server to which the nonfungible token is assigned. The secret code can be e.g. a printed code and is also known as a "second secret" and can be a password or PIN which allows a user to pair a physical object with the NFT and/or to access the digital twin. The secret code can also be a digital code and supplied in known formats for digital codes. The secret code may advantageously increase the level of security. The secret code is entered by using the application and/or is acquired by using the application.

In order to store the nonfungible token in a wallet, the user has to provide the secret code to gain access to the nonfungible token. If the secret code matches with the nonfungible token, the nonfungible token is sent to the further wallet address. In other words, this first user change activates the nonfungible token. The secret code can be used only for the first owner change, i.e. the first assignment of data information to the physical object.

In exchange to sending the nonfungible token to the further wallet address, the user of this further wallet address can send a digital asset to the wallet address of the sending user respectively wallet. The digital asset can be a bitcoin, a digital token or any other digital asset. The digital asset of the other user can be sent to the wallet address of the user before or at the same time or after the nonfungible token was sent to the further wallet address. In particular, the digital asset can be sent when the non-fungible token is firstly created or when the non-fungible token is assigned to another user. Vice versa the nonfungible token of the user can be sent to the further wallet address, when the digital asset was sent to the wallet address of the user.

According to an aspect, the method further comprises steps which relate to an update of information assigned to the nonfungible token. As a first step, the user may again execute an application on the user terminal. This application may be the same or a different application as in the method related to the first user change.

In a second step, the user may again scan the image of the physical information carrier using the application, or select the nonfungible token from the wallet using the same or a different application. Next, the application may receive a data input from the user. For this purpose, the application may provide a graphical user interface.

In a next step, the application sends the data to the wallet server. Subsequently, the information assigned to the non-fungible token is updated in accordance with the input data. In the update process it is not needed to enter the secret code. In an alternative embodiment it can be needed that a secret code is entered.

According to an embodiment, the method can comprise a reading process of the nonfungible token. In particular, the process comprises steps which relate to reading out data stored in the nonfungible token. In particular, public data is read out from the nonfungible token.

In a first step, the user may start an application which is executed on the user terminal. This may be the same app as in the method described above. In a second step, the user may again scan the image of the physical information carrier using the application. By acquiring the image, especially the encoded parts of the images, the nonfungible token assigned to the image is determined. The application requests the information, in particular content, assigned to the nonfungible token, finally, the application may display the information assigned to the determined nonfungible token on the user terminal, for example using a graphical user interface.

The user terminal can be a mobile device, for example a smart phone, a tablet computer, or a laptop. The user terminal may be connected to a network such as the internet by means of a gateway, either via a wired or a wireless connection. The mobile device can carry out an identity check of the user before executing the app. For example, the mobile device may scan a finger print, or an eye or a face of the user to identify the user as an authorized user of the mobile device.

The method can be used for authentication, product information for e.g. medicine, packaging, food applications, tickets, certificates, banknotes, DIB (Digital Item Broker), trading cards, lotteries, sweepstakes, one time passwords (OTPs), tickets, certificates, paintings, works of art, admission, admission tickets, authenticity certificates, shares, promissory notes, cheques, Bonds, identification cards, driving licenses, access authorizations, in particular for car, e-bike and e-scooter rental, playing figures, playing cards, trading cards, valuables, textile products, shoes, outdoor equipment, immobilizers, register, customer cards, credit cards, pre-paid cards, payment and credit cards, debit cards, gift cards, car keys, keys, goods logistics, goods tracking, digital order and storage systems, cataloguing, digital index card system, access to closed areas, both real and virtual, virtual content, ID cards, membership cards, time cards, payment applications, digital and physical transactions, marketing applications, customer loyalty applications, signatures, general anti-counterfeiting, items in computer games, media downloads, immobile goods and intangible goods e.g. patents, digital land register, trademarks, as well as authentication and/or verification of all of the above.

An advantage of the invention is that it was realized that non-fungible tokens can be used to represent a digital ownership of digital assets. For example, digitally generated images are assigned to a fixed owner. By depositing the NFT in the blockchain, an NFT cannot be manipulated and ownership and changes can be seen by everyone without gaps. One can speak of a kind of digital land register which can be easily used in the same manner as it is known for decades in the world. But the present invention has a lot more benefits and solves a lot of the problems of the non-digital world. Exemplary for this digital land register the code cannot be copied and due to the real time assignment of NFT and the proof of the technology itself the invention combines to very secure methods in almost real time assuring security and authenticity of transactions and ownerships. Land register are known for more than 200 years. Transactions of land and information about land was slow and not secure at all. Even today the registration and assignment of property rights is a very slow process and has issues all over the process. The present invention solves e.g. the secure transfer of assets as well as the proof of ownership. Further benefits are that the transactions can be paid by transfer digital assets which either can be a digital currency or vice versa represent a physical good through an NFT. With the present invention the owner of a physical good can exchange it to one or more of the same kind or to digital tokens.

The present invention combines the safe unique decoding result with the advantages of Blockchain and NFT technologies. With the decoding result, a unique, unforgeable ID can be physically assigned to each product. Manufacturers or end customers stick the physical image carrier on the product and add the most important attributes to the resulting digital twin using a mobile phone app or interface. This in turn is firmly linked to a nonfungible token. This creates a kind of digital land register or digital property book. This combines the physical world with the digital world and thus allows services that were previously only reserved for the digital world to be offered for physical products as well.

Therefore, an unambiguous attribution of ownership can be achieved. Additionally, complete transparency in the order of ownership and possession can be achieved. It is also possible to secure transfer of digital twins and digital ownership of physical products to the digital world. In particular secure global trade of physical products by ensuring uniqueness can be achieved.

In the figures, the subject-matter of the invention is schematically shown, wherein identical or similarly acting elements are usually provided with the same reference signs. Therein shows:

FIG. 1 a view of a physical information carrier with an image.

FIG. 2 schematically illustrates a method of creating a nonfungible token according to an embodiment of the invention.

FIG. 3 schematically illustrates a method of performing a first owner change of an NFT according to an embodiment of the invention.

FIG. 4 schematically illustrates a method of updating data stored in a digital twin associated with an NFT according to an embodiment of the invention.

FIG. 5 schematically illustrates a method of reading out data stored in a digital twin associated with an NFT according to an embodiment of the invention.

FIG. 6 a flow chart for determining the decoding result and for determining the authenticity of the physical carrier information.

FIG. 7A an image of a physical information carrier with an encoded image part and a non-encoded image part.

FIG. 7B the image of FIG. 7A after it is copied by a copying machine.

FIG. 8 shows the results of the sixth step of the decoding process and the seventh step of the authenticity check and the possible combinations thereof.

FIG. 9 shows different cases and combinations dependent on the outcomes of the decoding process and the authenticity check shown in FIG. 8.

Figure 1:
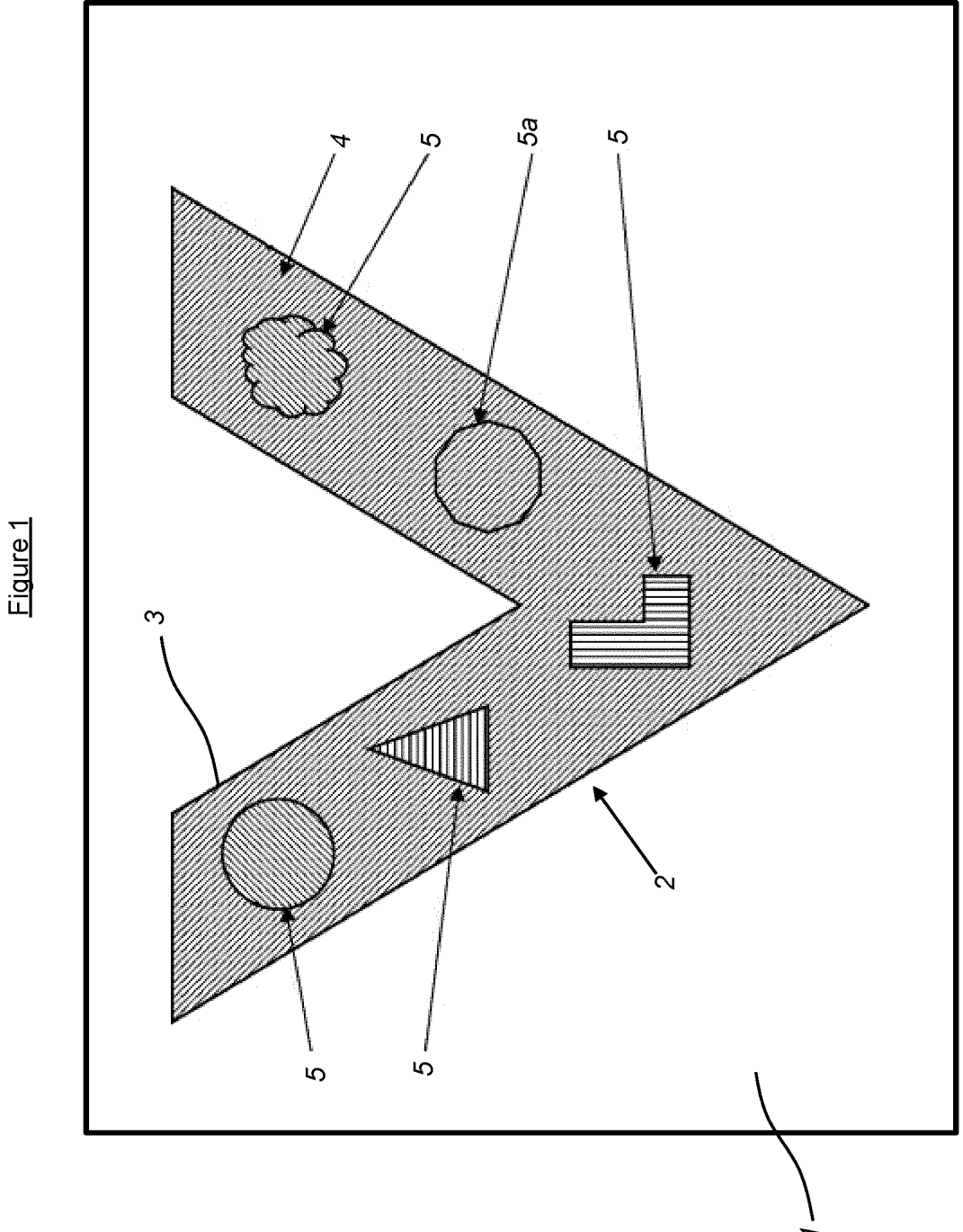

The physical information carrier 1 shown in FIG. 1 comprises a printed image 2, wherein the physical information carrier 1 can be a label. The printed image 2 comprises an outer contour 3 delimiting the image. Additionally, the image 2 comprises a non-encoded image part 4 and a plurality of encoded image parts 5, 5a. The non-encoded image part 4 and the encoded image parts 5 are arranged within the outer contour 3. Additionally, the non-encoded image part 4 and the encoded image parts 5 comprise a plurality of grid points. The grid points arranged in the encoded image parts 5 are manipulated with respect to the grid points arranged in the non-encoded image part 4.

The encoded image parts 5 differ in the arrangement of the grid points from the non-encoded image part 4. That means, said encoded image parts 5 differ in a grid property from the non-encoded image part 4. However, in the other encoded image part 5a the grid points arrangement is the same in the non-encoded image part 4. That means, the grid property of the other encoded image part 5a is the same as of the non-encoded image part 4.

In the frame of decoding the image, the application to decode the image knows the position of the encoded image parts 5, 5a. It analyzes the grid property and can assign value to each encoded image part 5, 5a. For example, a binary value can be assigned to each encoded image part 5, 5a that is dependent whether the grid property of the respective encoded image part 5, 5a corresponds a grid property of the non-encoded image part or not.

Figure 2:
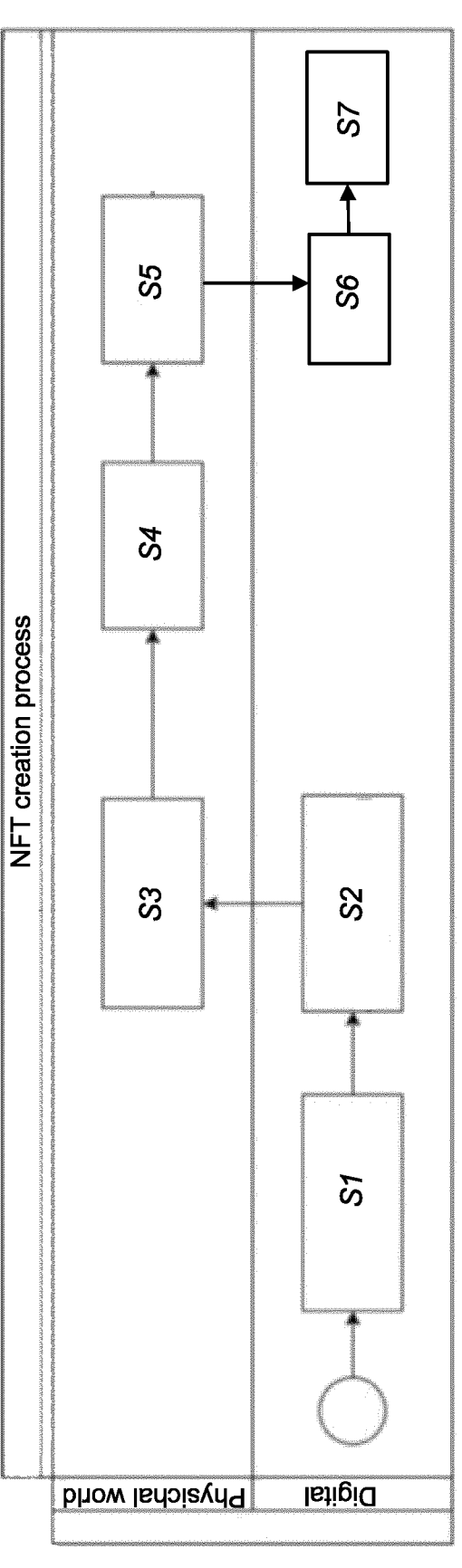

FIG. 2 shows a flow diagram illustrating an exemplary embodiment of the method of assigning information referring to a physical object to a nonfungible token. The upper row of the diagram represents the physical world, while the lower row represents the digital world.

In a first step S1, the nonfungible token (NFT) is created by using an application, in particular a web based application. The application establishes a data connection with a blockchain node or a cloud server. In a next step S2 a connection of the application and an acquiring device is established. Thereto, an identifier like a code provided by the application is shown on a display device. The acquiring device can acquire said code in a step S3. This can be done by a built in camera of the acquiring device. After acquiring said code, the blockchain node or cloud server and the acquiring device are peered.

Afterwards an image 2 of the physical carrier 1 is acquired by means of an acquiring device in a further step S4. The acquiring device identifies the encoded image parts of the image and decodes them in step S5. The decoding result is transmitted to the application server in step S6 and, thus, assigned to the nonfungible token. At this step S6 the nonfungible token is assigned to the physical object and can be considered as digital twin of the physical object. Afterwards, in step S7 the non-fungible take is sent to a wallet address of a wallet server.

In another step (not shown in FIG. 1), a secret code (also known as "second secret") can be generated. This secret code serves as an access code to the digital twin and/or the NFT.

Figure 3:
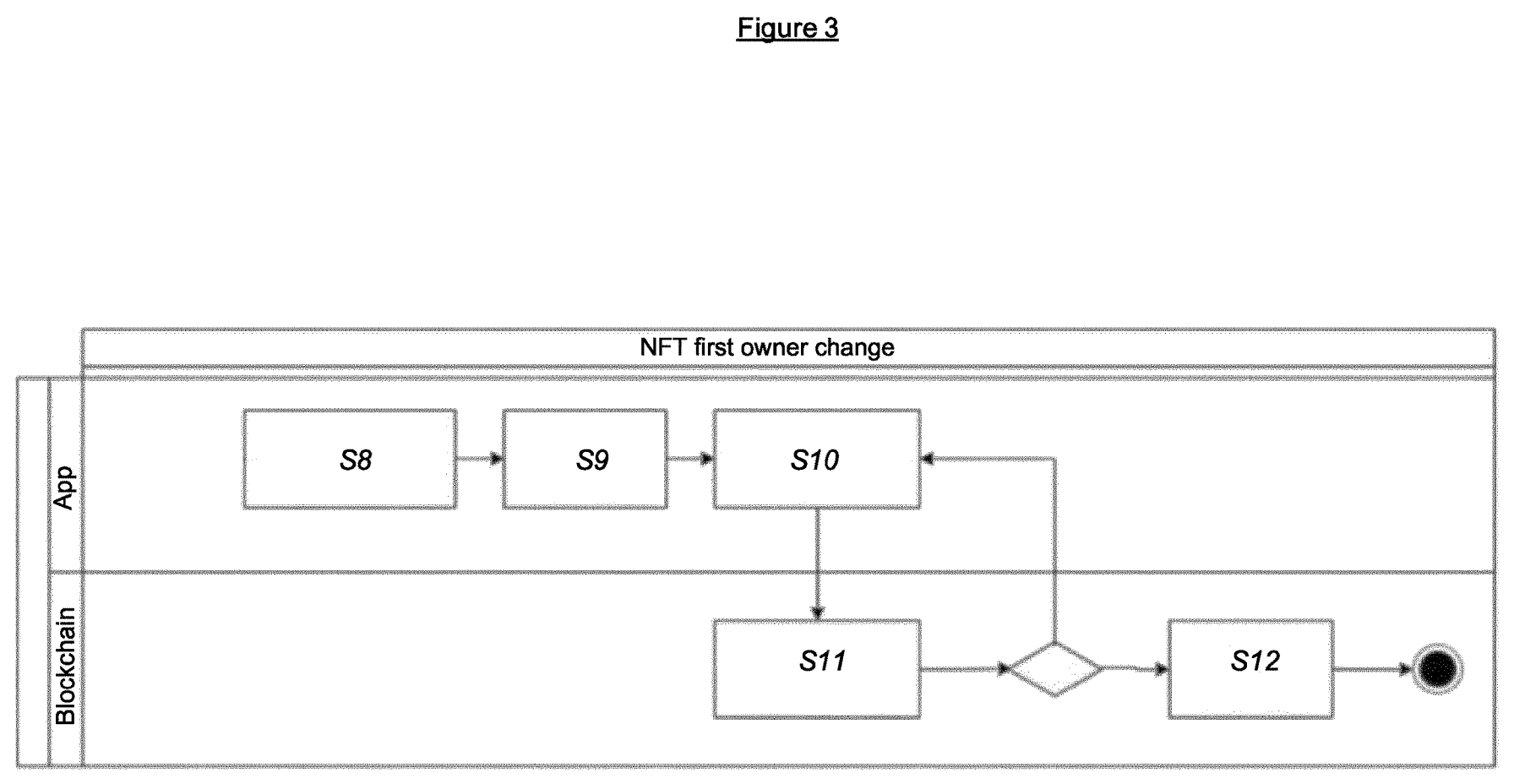

FIG. 3 shows a flow diagram which illustrates exemplary a method of performing a first owner change of a nonfungible token according to an embodiment of the invention. The upper row of the diagram shows the steps carried out by an application which may be executed by an user terminal, such as a mobile device, while the lower row shows what happens in the device that is peered with the acquiring device. This device can be the cloud server or blockchain.

After scanning the image of the physical information carrier in step S8, the application executed on the user terminal knows the nonfungible token that shall be assigned. In particular, the application knows the decoding result assigned to the nonfungible token. Additionally, a further wallet address is created on the wallet server in step S9. In a next step S10, the nonfungible is requested via the decoding result and using the secret code as an access key.

Then the blockchain checks the secret code for the requested nonfungible token in step S11. If the secret code matches, in other words, if the key matches the lock, the nonfungible token is sent to the further wallet address in step S12. This means that after scanning the code image and providing the secret code, the nonfungible token is transferred to the wallet of the user. This way, ownership of the nonfungible token changes to the user of the app who owns the secret code. Correspondingly, ownership of the physical object is registered to the user. Furthermore, the ownership may also be registered in the nonfungible token which serves as a record.

Figure 4:
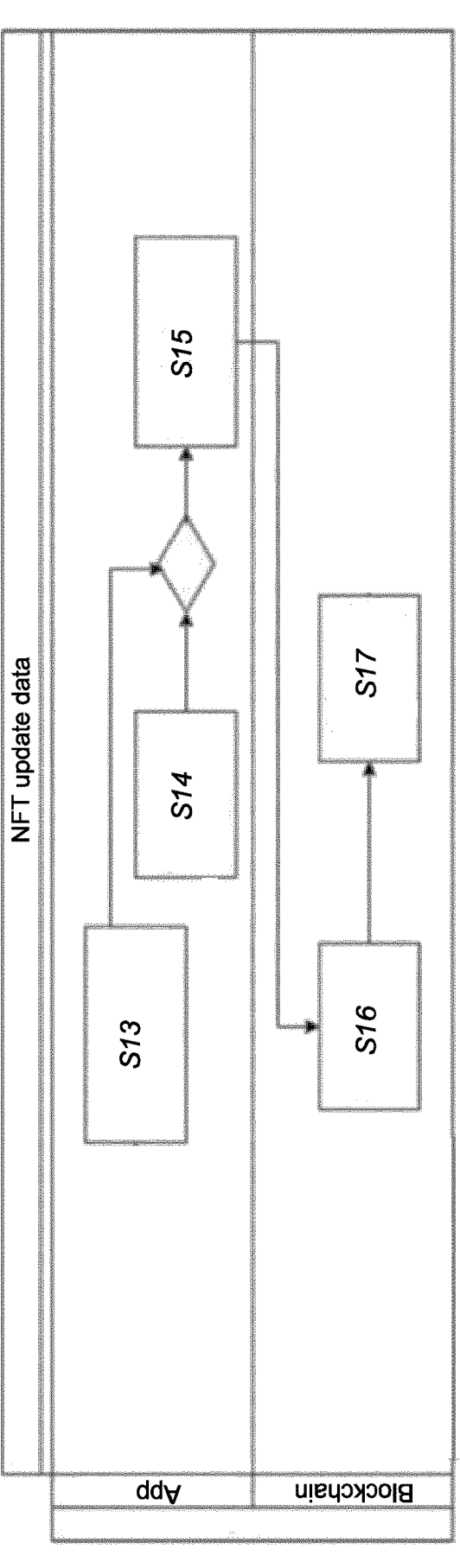

FIG. 4 shows a flow diagram which illustrates a method of updating data stored in the nonfungible token. The upper row of the diagram shows the steps carried out by an application which may be executed by a user terminal, such as a mobile device, while the lower row shows what happens in the blockchain.

In a step S13, the user again acquires the image of the physical information carrier using the application executed on the user terminal. Alternatively, the user may select the nonfungible token from the wallet in a step S14, which has already been requested as described above. Both functions may be provided by the application.

Subsequently, the user may input new data, for example as text or image data in step S15. The data can relate to any information associated with the physical object. For example, the user may specify what kind of physical object the code image has been applied to. Furthermore, data related to the owner of the physical object may be input by the user. Then the user may submit the input data to the blockchain. For the purpose of data input, a graphical user interface is provided by the app on a display unit of the user terminal.

In a next step S16, the backend of the application connects to the wallet server and opens a connection to the blockchain. For example, the application may open an API (application programming interface) which communicates with an updating server. Then the app sends the new data together with the wallet address of the nonfungible token and/or nonfungible token to the updating server, which in turn provides the service of updating nonfungible token. As a result, the content of the digital twin may be updated in step S17. The update can only perform if the nonfungible token is also sent to the oracle. That means, a user that is not in possession of the token, cannot update the data.

This function may be used, for example, for adding new data to the nonfungible token, for example a name of the owner of the physical object, and/or a change of a specific characteristic of the physical object. As an example, the nonfungible token may be used as a lifelong service record of the physical object. Thus, any maintenance or repair of the physical object may be tracked by the digital twin. Service record data may also be used to verify the authenticity of the physical object as it helps to track events related to the physical object. Furthermore, any change of ownership can be recorded in the digital twin.

Figure 5:
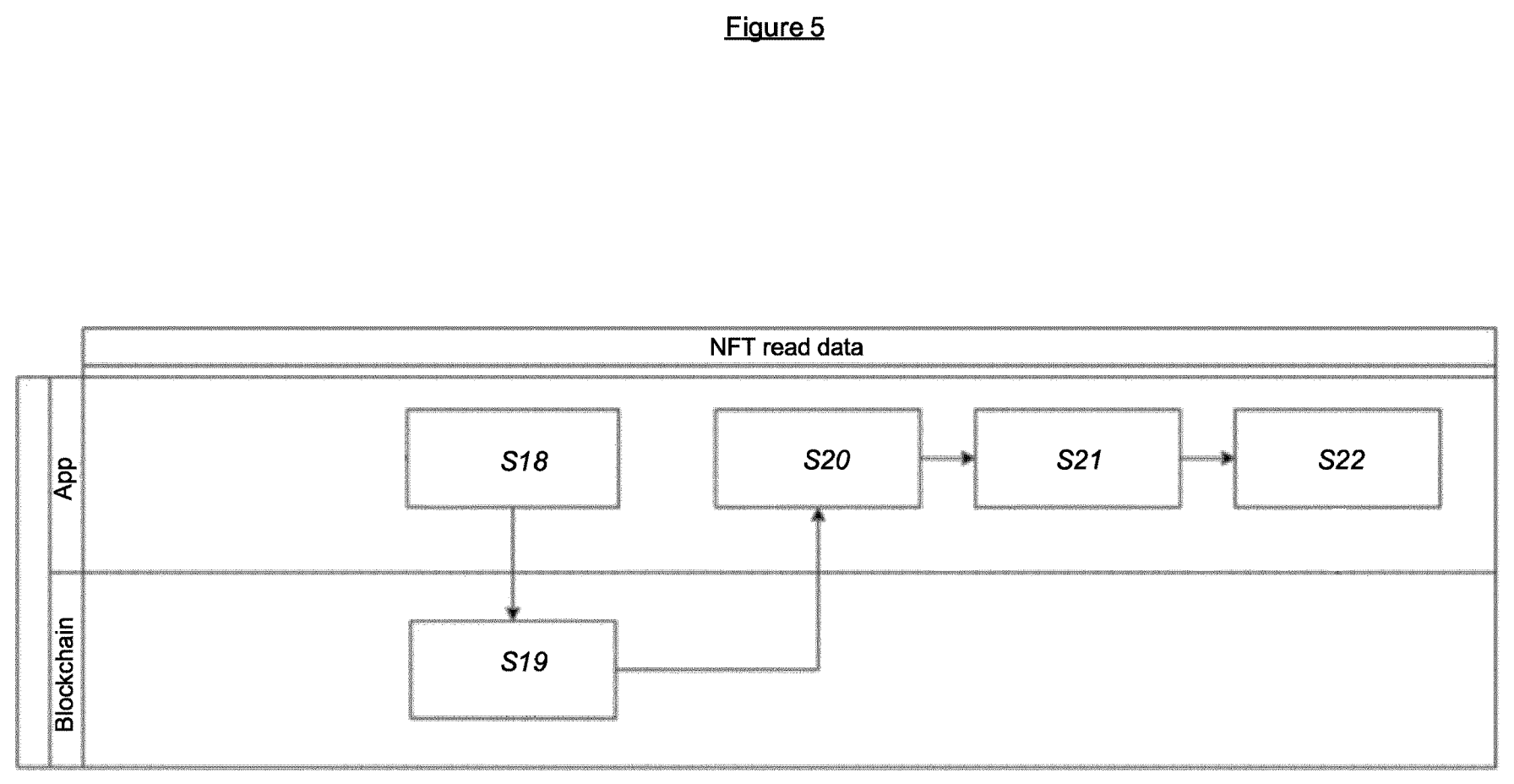

FIG. 5 shows a flow diagram which illustrates a method of reading out data stored in a nonfungible token associated with a nonfungible token according to an embodiment of the invention. Such a read out of data may also be available publicly, without the need for the secret code. The upper row of the diagram shows the steps carried out by an application which may be executed by a user terminal, such as a mobile device, while the lower row shows what happens in the blockchain.

In a step S18, the user may scan the image of the physical information carrier using the app. By scanning the image, the nonfungible token assigned to the decoding result is known. In a next step S19, the content of the nonfungible token may be requested by the app. The wallet server storing the nonfungible token may then transmit the content of the nonfungible token to the application in step S20. Furthermore, the application may visualize the content of the nonfungible token using a graphical user interface in step S21. This graphical user interface may also allow the user to use the data of the nonfungible token for interactions with other available services in step S22.

The application mentioned in the above description of embodiments may be a single application combining all described functions or may be embodied as different applications, each providing one or more of the described functions. In particular, the app may provide a plurality of features and functions associated with the nonfungible token and/or with the physical object. Thus, by applying the physical information carrier having the image to the physical object, a connection between the physical object and the nonfungible token may be established in the real world which in turn can be accessed by scanning the image using the one app or the plurality of apps.

As an example, a photography artist wants to sell a limited amount of copies of a photograph. In order to uniquely identify each copy as an authentic print of his photograph, he applies a physical code image to each copy. Each code image corresponds to a unique nonfungible token created in a blockchain. With each purchase of a printed copy of the photograph, the buyer is provided with the secret code in order to transfer the corresponding nonfungible token into his own digital wallet using an application. The information regarding the purchase and the new owner can be updated in the corresponding nonfungible token when scanning the image with the application and providing the secret code.

Furthermore, as another example, a plurality of paintings or prints of photographs of an artist or a plurality of artists may be displayed in a gallery. Each piece of art is provided with a respective physical code image, each paired to a corresponding NFT. By scanning the image with an application, a visitor of the gallery may obtain public information stored in the corresponding digital twin. This way, information about the piece of art and proof pf its authenticity may be displayed to the user of the application.

The methods described above thus allow to generate a correlation between a unique nonfungible token and a physical object. At the same time, a nonfungible token, which can serve as a permanent record of the physical object is generated. As a result, any physical object of the real world can be uniquely linked to a digital service record, thereby providing additional virtual features previously not available. Thus, a complete record of the physical object throughout its entirely life can be provided in the nonfungible token. The nonfungible token may comprise a plurality of information such as date and/or place of manufacture, each owner together with a date of purchase, each transaction, its current value, service transactions, etc. Furthermore, various smart contracts may be provided via an application when scanning the image of the physical information carrier. The nonfungible token and the digital twin can thus provide additional security, proof of ownership, proof of authenticity, history of service, etc.

Figure 6:
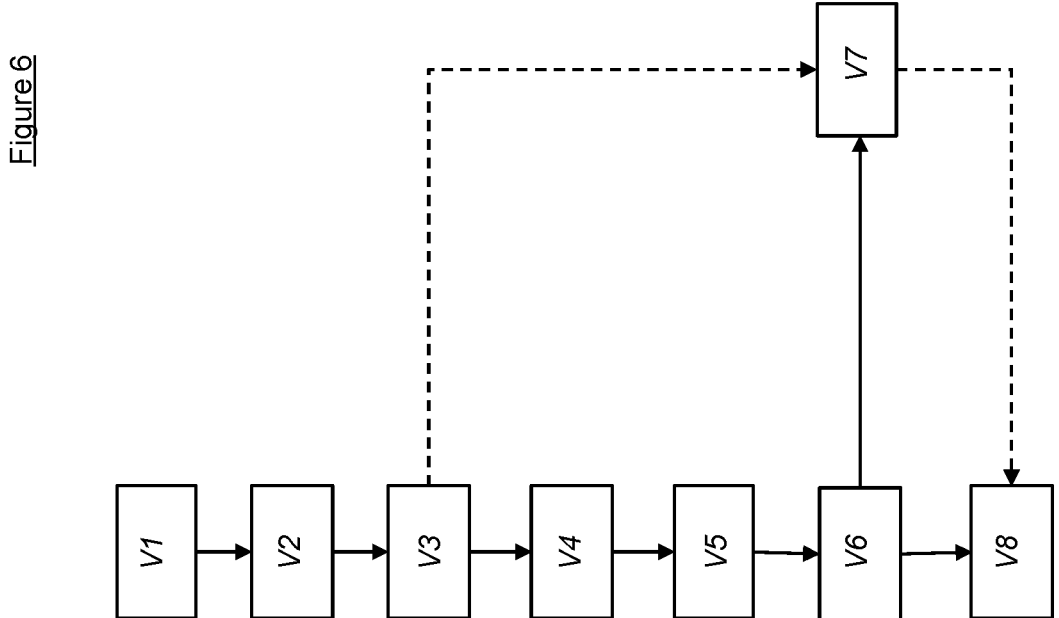

FIG. 6 shows a flow chart for determining the decoding result and for determining the authenticity of the physical carrier information. In a first step V1, the acquiring device acquires an image of the physical information carrier. In particular, the acquiring devices determines the encoded image parts and the non-encoded image parts of the image. Thereto, it is possible that an algorithm stored in the acquiring device checks the complete image to determine the encoded image part or parts. Alternatively or additionally, it is possible that the position and/or size of the encoded image parts are stored in the acquiring device.

In a second step V2, the non-encoded image part is removed so that only the encoded image part is processed further in a third step V3. In the third step V3 data is classified. In particular, the encoded image parts 5 are classified. That means, a value is assigned to the encoded image parts 5. The value can be 0 or 1 or any other value. At the end of the third step V3 a bit stream or a data stream is present. During this process the encoded image parts can be already used for the authenticity check proving independently from a bit stream or a data stream if the used encoded image parts will be recognized as authentic and therefor the physical information carrier is authentic by classification means mentioned above. So we have a classification in bits or data in the decoding process and a classification in terms of manipulation methods and parameters thereof in the authenticity check.

In a fourth step V4 a check sum test is performed. In particular, it is tested whether the bit stream or data stream resulted from the third step corresponds to a predetermined value. The check sum test can be a cyclic redundancy check (CRC). If the check sum corresponds to the predetermined value, a fifth step V5 is performed. In the fifth step V5 a bit or data correction is performed.

In a sixth step V6 a payload extraction is performed. The extracted payload corresponds to the decoded result. The payload extraction can be an identifier, binary code or a data string as a result. In a non-shown embodiment the bit stream or data stream resulted from the third step can correspond to the decoded result.

In a seventh step V7 the authenticity check is performed. The seventh step V7 can be performed after the seventh step V6 as it is indicated by the solid line or after the third step V3 as it is indicated by the dotted line. In the seventh step V7 it is checked whether the at least image part encoded image part corresponds to a predetermined information. The predetermined information is an information how the encoded image part has to be manipulated. That means, the acquiring device checks whether the manipulation method that is performed in the at least one encoded image part corresponds to the predetermined information, i.e. the stored manipulation method. If this condition is fulfilled, the acquiring device determines that the at least one encoded image part and thus the physical information carrier is authentic.

The decoded result can be sent to a non-shown electrical device, in particular server, that differs from the acquiring device in an eight step V8. This is only possible if the decoded result is a complete code. Otherwise, the decoding process is aborted. Additionally, it is possible to send additional data, like the location of the acquiring device, time, data, etc., to the non-shown server. The server can check whether the sent decoding result correspond to predetermined code. If the condition is fulfilled, an action can be performed. The action can be to exchange information between the acquiring device and the sever and/or to assign the decoding result and thus the physical information carrier to the non-fungible token.

In the eighth step S8 the decoding result is compared with a predetermined code that is stored in the electrical device, in particular server. Based on the comparison result it can be determined whether the physical information carrier is an authentic carrier. This is the case when the decoding result corresponds to the predetermined code. However, the aforementioned check of the decoding result is not 100% sure criteria because counterfeiters could copy the physical information carrier by means of an optical copy device such as a copying machine preferably a photocopying machine. Thereto, an authenticity check can be performed.

The first to sixth step V1-V7 is performed on the acquiring device, in particular a processing device of the acquiring device. The decoding process performed in the first to sixth step V1 to V6 is executed serial in the shown figure. However, alternatively the third to sixth step V3 to V6 can be performed parallel to each other. The processing device can comprise at least one processor or be a processor.

Figures 7A, 7B:
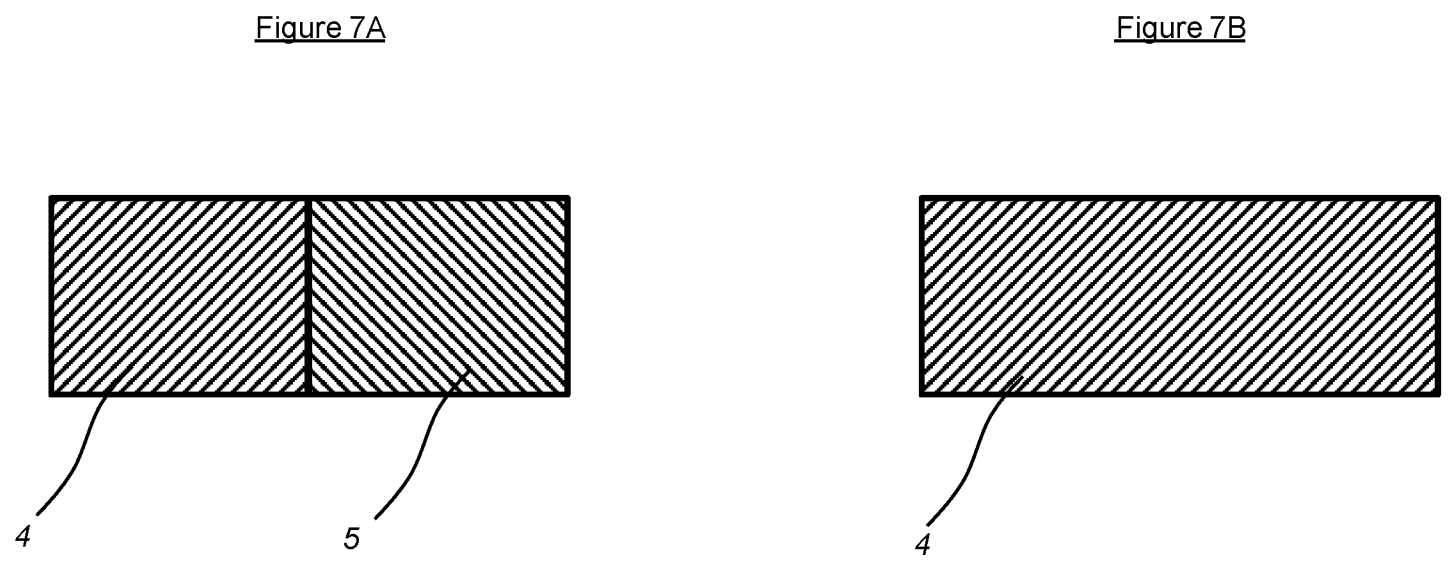

The eight step V8 is explained by using FIGS. 7A and 7B. FIG. 7A shows an image of the physical carrier information with an encoded image part 5 and a non-encoded image part 4. FIG. 7B shows the image of FIG. 7A is copied by a copying machine.

As is evident from FIG. 7A the encoded image part differs from the non-encode image part in the screen angle of the lines of the image grid. The lines can refer to a specific colour, in particular to magenta. Thus, in the eight step V8 the algorithm checks whether the encoded image part is manipulated such that lines of the image grid are orientated as shown in FIG. 7A. In particular, the algorithm checks whether the manipulation method used for manipulating the encoded image part 5 corresponds to a predetermined manipulation method.

As is evident from FIG. 7B the copying machine did not copy the manipulated encoded image part 5 but the complete image grid looks identical. In particular, the copying machine does not recognize the encoded image part and thus copies the image having the grid property of the non-encoded image part. Thus, the algorithm would recognize in the eight step V8 that the manipulation of the encoded image part, which position and/or size is known to the algorithm, does not correspond to the predetermined manipulation method. Thus, the algorithm determines that the image shown in FIG. 7B is not authentic.

FIG. 8 shows the possible results of the sixth step V6 and the authenticity check performed in the seventh step V7. The table shows on its left column the outcome of the sixth step V6 and its right column the outcome of the authenticity check performed in the seventh step V7. The results can be used alone or preferred as a combination so that 4 different combinations are possible.

For the outcome of the sixth step V6, "A-Code" indicates that the outcome of the payload extraction is a complete decoding result that can be used in the eight step V8. With "B-no complete code" it is indicated that the payload extraction resulted in a non-complete code that cannot be used in the eight step V8. In said case the eight step V8 is not initiated. If the code is only partially available after the sixth step V6 the eight step V8 can be used even if the result will lead to not further usable data.

For the outcome of the seventh step V7, the term "C-Authentic" indicates that the outcome of the seventh step V7 is that the physical information carrier is authentic and not a fake. The term "D-Fake" indicates that the outcome of the seventh step V7 is that the physical information carrier is a fake.

In any of the cases shown in FIG. 8, it is known whether the physical information carrier is authentic or not. Preferably the determination whether the physical information carrier is an authentic physical information carrier can be performed on the acquiring device even without internet connection or any data connection to further devices or data rooms e.g. data bases, server, computer etc.

FIG. 9 shows different cases dependent on the outcomes of the decoding process and the authenticity check shown in FIG. 8. The states result after the eight step V8 is executed. In this case, in the eight step V8 it is checked whether the decoding result matches with the predetermined code stored in the electrical device, in particular server. With respect to the states shown in FIG. 8 two more states are existent as the result of the eight step V8 is also considered in FIG. 9. The use of the result of the authenticity check performed in seventh step V7 is indicated with dotted lines in FIG. 1.

In the following, the different cases are discussed:

In case 1 the decoding result, i.e. the code, is assigned to a non-fungible token and the physical information carrier is an authentic physical information carrier assigned to an existing and corresponding non-fungible token.

In case 2 the decoding result, i.e. the code, is not assigned to a non-fungible token and the physical information carrier is an authentic physical information carrier but not assigned to an existing and corresponding non-fungible token.

In case 3 the decoding result, i.e. the code, is assigned to a non-fungible token but physical information carrier is a fake physical information carrier while the code is assigned to an existing and corresponding non-fungible token.

In case 4 the decoding result, i.e. the code, is not assigned to a non-fungible token but the physical information carrier is a fake physical information carrier and not assigned to an existing and corresponding non-fungible token.

In case 5 the decoding result, i.e. the code, is not assigned to a non-fungible token but the physical information carrier is an authentic physical information carrier while it is not clear if the code is actually assigned to an existing and corresponding non-fungible token.

In case 6, the decoding result, i.e. the code, is not assigned to a non-fungible token and the physical information carrier is a fake physical information carrier while it is not clear if the code is actually assigned to an existing and corresponding non-fungible token.

The table above shows that it is possible to distinguish between different states and therefore multiple possibilities are possible how to handle the outcomes of the seventh and eight process. While Case 1 is the good case all other cases indicate a fake or indicate code problems. Having a code available even if we have a fake result (e.g. case 3) allows to give notice that an non-fungible token is tried to being copied and there are at least approaches to counterfeit. Vice versa a warning or information to the real owner of the authentic physical information carrier can be given automatically once his non-fungible token (assigned to his wallet) is suspect to a counterfeit attack.

REFERENCE SIGNS 1 physical information carrier
2 image
3 outer contour
4 non-encoded image part
5 encoded image part
5a other image part
S1-S22 Method steps

The invention claimed is:

1. A method for assigning information referring to a physical object to a nonfungible token, wherein the method comprises:

creating a nonfungible token;

optically acquiring an image of a physical information carrier, wherein the physical information carrier comprises a printed image, the printed image comprises at least one non-encoded image part and at least one encoded image part each defined by grid points of a printing grid, and the grid points of the encoded image part are manipulated with respect to the grid points of the non-encoded image part;

identifying the encoded image part in the image of the physical information carrier; and decoding the encoded image part and assigning the decoding result to the nonfungible token;

wherein the grid points of the encoded image part are manipulated by modifying at least one printing parameter selected from screen angle, raster frequency, amplitude-modulated raster properties, frequency-modulated raster properties, area content of the grid points, or contour of the grid points.

2. The method according to claim 1, wherein the printed image further comprises an acquirable contour, and wherein the at least one encoded image part and the at least one encoded image part are arranged within the contour.

3. The method according to claim 1, wherein an assignment process for assigning the information to the nonfungible token comprises:

a. an application that is executed to create the nonfungible token; and/or b. an application to create the nonfungible token, wherein the application connects to a wallet server and/or a wallet address is created on a wallet server; and/or c. an application that is executed and connected to a cloud server or blockchain node used for creating the nonfungible token; and/or d. an identifier that is generated or an identifier that is generated after the application is connected with the wallet server.

4. The method according to claim 3, wherein:

a. an acquiring device is connected with the application for data exchanging; and/or b. the acquiring device peers with the cloud server or blockchain node; and/or c. the acquiring device acquires the identifier and is peered with the cloud server or blockchain node after acquiring the identifier.

5. The method according to claim 1, wherein:

a. an acquiring device acquires the image from the physical information carrier; and/or b. the acquiring device acquires the encoded and non-encoded image part; and/or c. the acquiring device decodes the at least one encoded image part and transmits it to the cloud server or blockchain node.

6. The method according to claim 1, wherein:

a. further information related to the physical object can be created; and/or b. further information related to the physical object can be transmitted to the application server.

7. The method according to claim 1, wherein:

a. the nonfungible token is sent to a wallet address after the decoding result is transmitted to a cloud server or blockchain node; and/or b. the nonfungible token is assigned to the physical object based on the decoding result; and/or c. the decoding result is a hash value and/or a digital code format; and/or d. the decoding result is determined based on an intermediate result of the decoding.

8. The method according to claim 1, wherein:

a. the physical information carrier is attached to the physical object; and/or b. the physical information carrier is attached to the physical object before or at the same time or after the decoding result is transmitted.

9. The method according to claim 1, wherein:

a. the non-encoded image part and the encoded image part differ in a printing grid property from each other; and/or b. the grid property of the encoded image part is analyzed during the decoding.

10. The method according to claim 1, wherein an assignment process for assignment of the nonfungible token to a further wallet comprises:

a. executing an application on an acquiring device;

b. acquiring the image from the physical information carrier using the application;

c. determining the encoded image part using the application; and d. decoding the encoded information using the application.

11. The method according to claim 10, wherein a further wallet address is determined.

12. The method according to claim 10, wherein the nonfungible token is requested by transmitting the decoding result and/or a secret code to a wallet server to which the nonfungible token is assigned by using the application.

13. The method according to claim 12, wherein:

a. the secret code is entered by using the application; and/or b. the secret code is acquired by using the application; and/or c. the secret code is entered by using a cloud server or blockchain node; and/or d. the secret code is verified by using the cloud server or blockchain node; and/or e. the secret code is entered by using the wallet server to which the nonfungible token is assigned; and/or f. the secret code is acquired by the wallet server to which the nonfungible token is assigned.

14. The method according to claim 12, wherein:

a. the nonfungible token is sent to the further wallet address if the secret code matches a predetermined code; and/or b. the nonfungible token is sent to the further wallet address in exchange for receiving a digital asset.

15. The method according to claim 1, wherein an updating process of updating information of the nonfungible token comprises:

executing an application on a user terminal;

acquiring the image from the physical information carrier using the application for determining the nonfungible token that is assigned to said information or selecting the nonfungible token from a wallet server using the application;

receiving data input by a user of the application;

transmitting the data to the wallet server; and updating at least one information assigned to the nonfungible token.

16. The method according to claim 1, wherein a reading process of the nonfungible token comprises:

executing an application on a user terminal;

acquiring the image of the physical information carrier using the application for determining the nonfungible token that is assigned to said information;

requesting the information assigned to the determined nonfungible token using the application; and displaying the information assigned to the determined nonfungible token on the user terminal.

17. The method according to claim 16, wherein the user terminal is a mobile device, and wherein the mobile device carries out an identity and/or security check of the user before and/or while executing the app.

18. The method according to claim 1, wherein it is determined based on the at least one encoded image part whether the physical information carrier is an authentic physical information carrier.

19. The method according to claim 18 wherein:

a. at least one manipulation method used for manipulating the at least one encoded image part is compared with a predetermined information and dependent on the comparison result it is determined whether the physical information carrier is an authentic physical information carrier; and/or b. the determination whether the physical information carrier is an authentic physical information carrier is performed on an acquiring device; and/or c. further information is used for an authentication process to determine whether the physical information carrier is authentic; and/or d. the decoding result is assigned to the nonfungible token, when the decoding result corresponds to a predetermined code stored in an electrical device, and when it is determined that the physical information carrier is authentic.

\* \* \* \* \*